United States Patent
Boonpongmanee

(10) Patent No.: US 9,140,324 B2
(45) Date of Patent: Sep. 22, 2015

(54) FLUID COOLED COUPLING ASSEMBLY

(75) Inventor: Thaveesak Boonpongmanee, Bay Village, OH (US)

(73) Assignee: EATON CORPORATION, Cleveland, OH (US)

(*) Notice: Subject to any disclaimer, the term of this patent is extended or adjusted under 35 U.S.C. 154(b) by 1188 days.

(21) Appl. No.: 12/429,219

(22) Filed: Apr. 24, 2009

(65) Prior Publication Data

US 2010/0270117 A1    Oct. 28, 2010

(51) Int. Cl.
*F16D 65/853*    (2006.01)
*F16D 25/0638*   (2006.01)
*F16D 65/02*     (2006.01)
*F16D 65/78*     (2006.01)

(52) U.S. Cl.
CPC .......... *F16D 65/853* (2013.01); *F16D 25/0638* (2013.01); *F16D 2065/132* (2013.01); *F16D 2065/784* (2013.01); *F16D 2300/021* (2013.01)

(58) Field of Classification Search
CPC ............ F16D 2065/784; F16D 65/853; F16D 2065/1328
USPC ........... 192/70.12, 113.3, 113.31; 188/264 B, 188/264 D, 264 CC, 264 F, 71.6
See application file for complete search history.

(56) References Cited

U.S. PATENT DOCUMENTS

| | | | |
|---|---|---|---|
| 1,132,958 A * | 3/1915 | Miller | 192/70.12 |
| 2,821,272 A * | 1/1958 | Eames et al. | 188/264 F |
| 2,934,178 A * | 4/1960 | Eaton | 188/264 D |
| 3,028,935 A * | 4/1962 | Gold et al. | 188/264 D |
| 3,047,103 A | 7/1962 | Schwartz | |
| 3,047,105 A * | 7/1962 | Schwartz | 188/264 D |
| 3,530,965 A | 9/1970 | Wilson | |
| 3,572,477 A * | 3/1971 | Ewart | 188/264 D |
| 3,648,814 A * | 3/1972 | Barron | 192/113.31 |
| 4,262,789 A | 4/1981 | Collins | |

(Continued)

FOREIGN PATENT DOCUMENTS

GB    860419    2/1961

OTHER PUBLICATIONS

Thesis Entitled "Computations of Flow Structures and Heat Transfer in a Dimpled Channel at Low to Moderate Reynolds Number", Wilfred Vinod Patrick, Apr. 25, 2005, Submitted to Faculty of Virginia Polytechnic Institute and State University.

(Continued)

*Primary Examiner* — Terry Chau
(74) *Attorney, Agent, or Firm* — Daniel S. Kalka

(57) ABSTRACT

A coupling assembly for use in transmitting force includes a housing which at least partially encloses a rotatable disc. The housing has a plate portion with an annular force transmitting surface which is engagable with the rotatable disc. A cooling fluid channel is at least partially defined by a side of the plate portion opposite from the force transmitting surface. A plurality of indentations disposed in an inner surface 60b of the force transmitting surface of the plate portion create turbulent and secondary flow in a path of flow of cooling fluid through the cooling fluid channel. A cooling fluid inlet includes a passage having a portion with a large cross section connected in fluid communication with a radially outer portion of the cooling fluid channel. A portion of the inlet passage having a small cross section is connected in fluid communication with a radially inner portion of the cooling fluid channel. Optional ribs extend across the radially inner and outer portions of the cooling fluid channel.

10 Claims, 5 Drawing Sheets

(56) References Cited

U.S. PATENT DOCUMENTS

| | | | |
|---|---|---|---|
| 4,828,089 A | * | 5/1989 | Collins et al. ............. 192/70.12 |
| 5,094,331 A | * | 3/1992 | Fujimoto et al. .......... 192/70.12 |
| 5,577,581 A | | 11/1996 | Eberwein |
| 7,114,605 B2 | * | 10/2006 | Grosspietsch et al. ....... 192/48.8 |
| 7,374,027 B2 | | 5/2008 | Mayberry et al. |
| 7,556,128 B2 | | 7/2009 | Mayberry et al. |
| 7,591,349 B2 | | 9/2009 | McConkie et al. |
| 2007/0095622 A1 | * | 5/2007 | Mayberry et al. ........ 188/264 D |
| 2008/0110708 A1 | | 5/2008 | Mayberry et al. |
| 2008/0185239 A1 | | 8/2008 | Hakon et al. |
| 2009/0065320 A1 | * | 3/2009 | Culmer ..................... 192/70.12 |
| 2009/0133974 A1 | | 5/2009 | Mayberry et al. |

OTHER PUBLICATIONS

Article Entitled "Nusselt Number Behavior on Deep Dimpled Surfaces Within a Channel", N. K. Burgess, M. M. Oliveira, and P. M. Ligrani, Feb. 2003, vol. 125, Journal of Heat Transfer.

Dimple Arrays on Surfaces of Channels, Phil Ligrani, Donald Schultz, Professor of Turbomachinery, University of Oxford, on the Web Dec. 1, 2008.

* cited by examiner

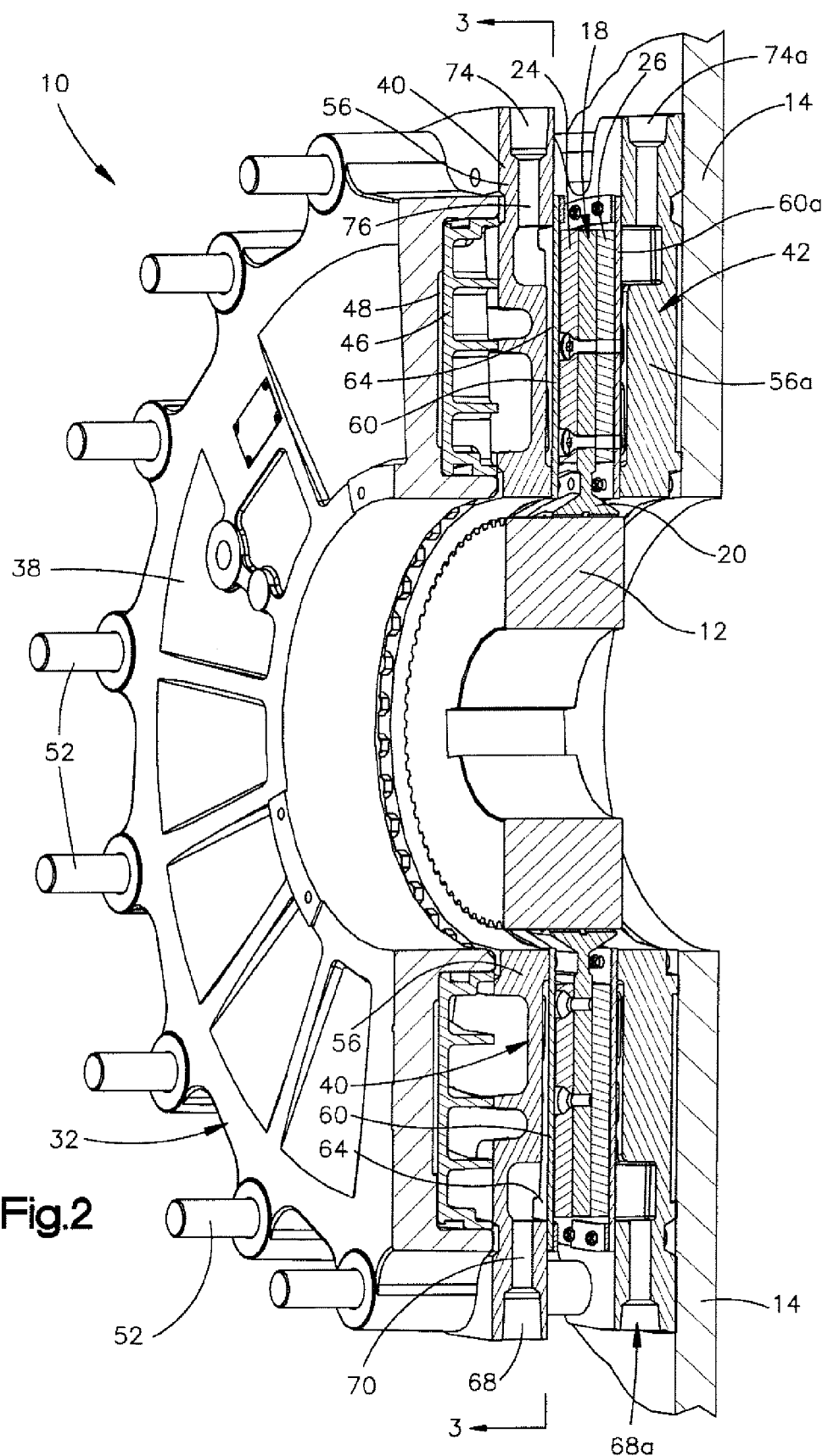

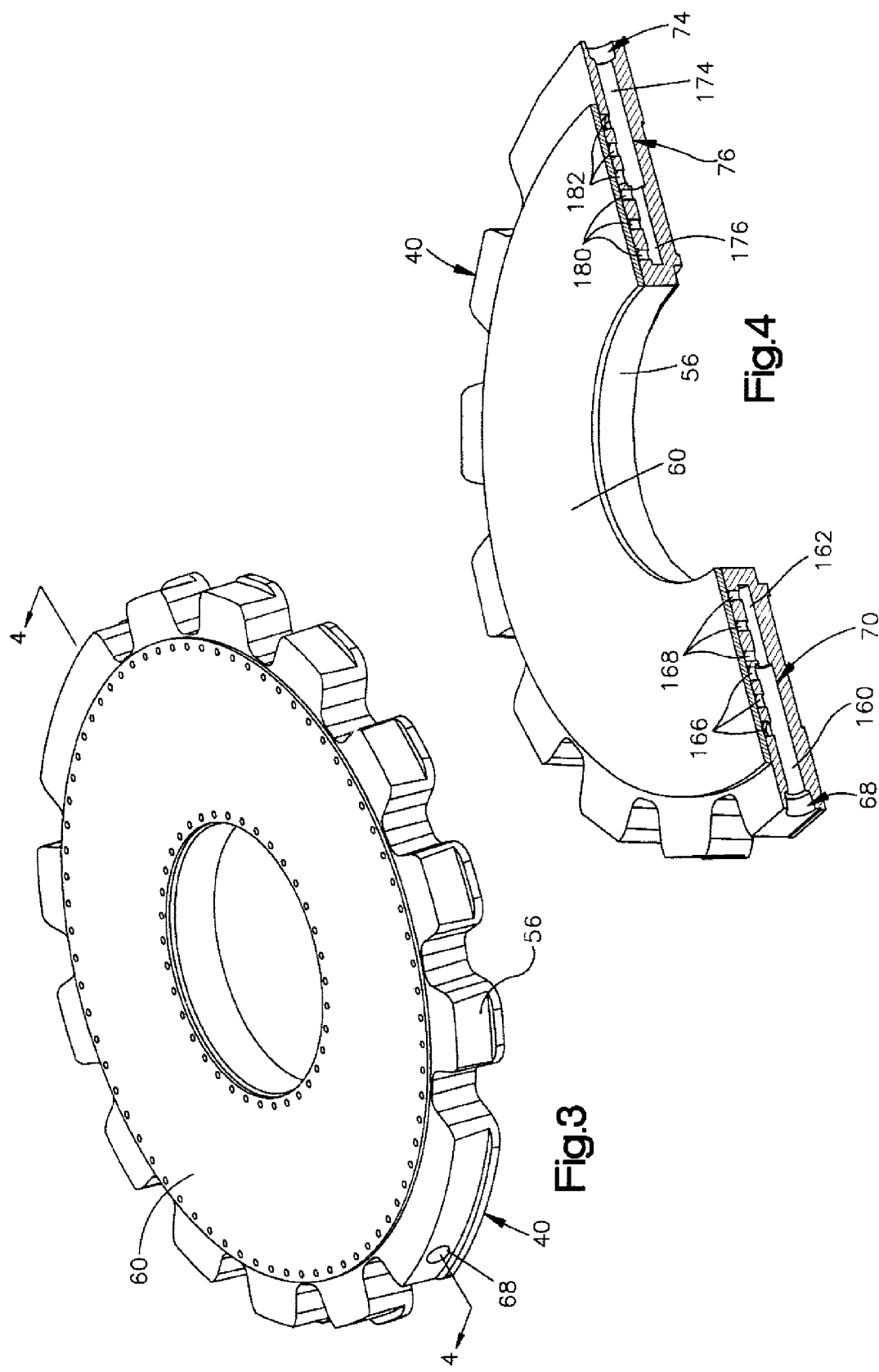

FLUID COOLED COUPLING ASSEMBLY

BACKGROUND OF THE DISCLOSURE

The present disclosure relates to a new and improved coupling assembly which may be a clutch and/or brake.

A coupling assembly which is utilized as a brake is disclosed in U.S. Pat. No. 4,262,789. This coupling assembly utilizes a flow of cooling fluid (water) to cool copper wear plates which engage a rotor to retard relative rotation between the rotor and a housing. Other coupling assemblies are disclosed in U.S. Pat. Nos. 3,530,965 and 5,577,581

During use of these coupling assemblies, heat is generated upon operation of the coupling assembly from a disengaged condition to an engaged condition. It has been suggested that components of the coupling assembly may be exposed to a flow of cooling fluid (water) to transfer heat from components of the coupling assembly to the cooling fluid. Even though the components of these coupling assemblies are exposed to a flow of cooling fluid, there tends to be a build up of heat in the components of the coupling assemblies. Under very severe operating conditions, the build up of heat may tend to become excessive at hot spots on components of the coupling assembly.

BRIEF SUMMARY OF THE DISCLOSURE

The present disclosure provides a new and improved fluid cooled coupling assembly having an improved flow of cooling fluid to promote the transfer of heat from components of the coupling assembly. Convective heat transfer from components of the coupling assembly to the flow of cooling fluid may be promoted by creating turbulent and secondary flow of the cooling fluid by providing indentations on a surface of a copper wear plate to improve heat transfer coefficient.

The coupling assembly may include the rotatable disc which is at least partially enclosed by a housing. The housing may have a plate portion with a force transmitting surface which is engagable with a side surface area on the rotatable disc to retard relative rotation between the housing and the disc. The housing may also have a cooling fluid channel which is at least partially defined by the side of the plate portion opposite from the force transmitting surface.

To improve heat transfer and minimize the occurrence of hot spots, a plurality of indentations disposed in an inner surface of the plate portion create turbulent and secondary flow in the cooling fluid channel. Additional turbulence may be induced in a flow of cooling fluid by having ribs project into the cooling fluid channel.

A fluid inlet to the cooling fluid channel may have a relatively large cross sectional area connected in fluid communication with a radially outer portion of the cooling fluid channel. The inlet may have a relatively small cross sectional area connected in fluid communication with a radially inner portion of the cooling fluid channel.

A coupling assembly constructed in accordance with the present disclosure has many different features which may advantageously be utilized together as disclosed herein. However, these features may be utilized separately or in combination with other features. For example, the cooling fluid inlet with different sizes for radially inner and radially outer portions of the cooling fluid channel may be utilized with projections into the cooling fluid channel. As another example, the projections may or may not include ribs.

Although the coupling assembly disclosed herein is utilized as a brake, it should be understood that the coupling assembly may be utilized as a clutch. It is contemplated that the coupling assembly may be a combination clutch and brake assembly.

BRIEF DESCRIPTION OF THE DRAWINGS

The foregoing and other features of the subject disclosure will become more apparent upon a consideration of the following description taken in connection with the accompanying drawings wherein:

FIG. 2 is an enlarged sectional view, taken generally along the line 2-2 of FIG. 1, further illustrating the construction of the coupling assembly;

FIG. 3 is a partially broken away pictorial illustration, taken generally along the line 3-3 of FIG. 2, illustrating the relationship of a wear plate to another portion of the housing of the coupling assembly;

FIG. 4 is a sectional view, taken generally along the line 4-4 of FIG. 3, illustrating the relationship of a cooling fluid inlet and a cooling fluid outlet to a portion of the housing of the coupling assembly of FIGS. 1 and 2;

DETAILED DESCRIPTION

Figure 1:
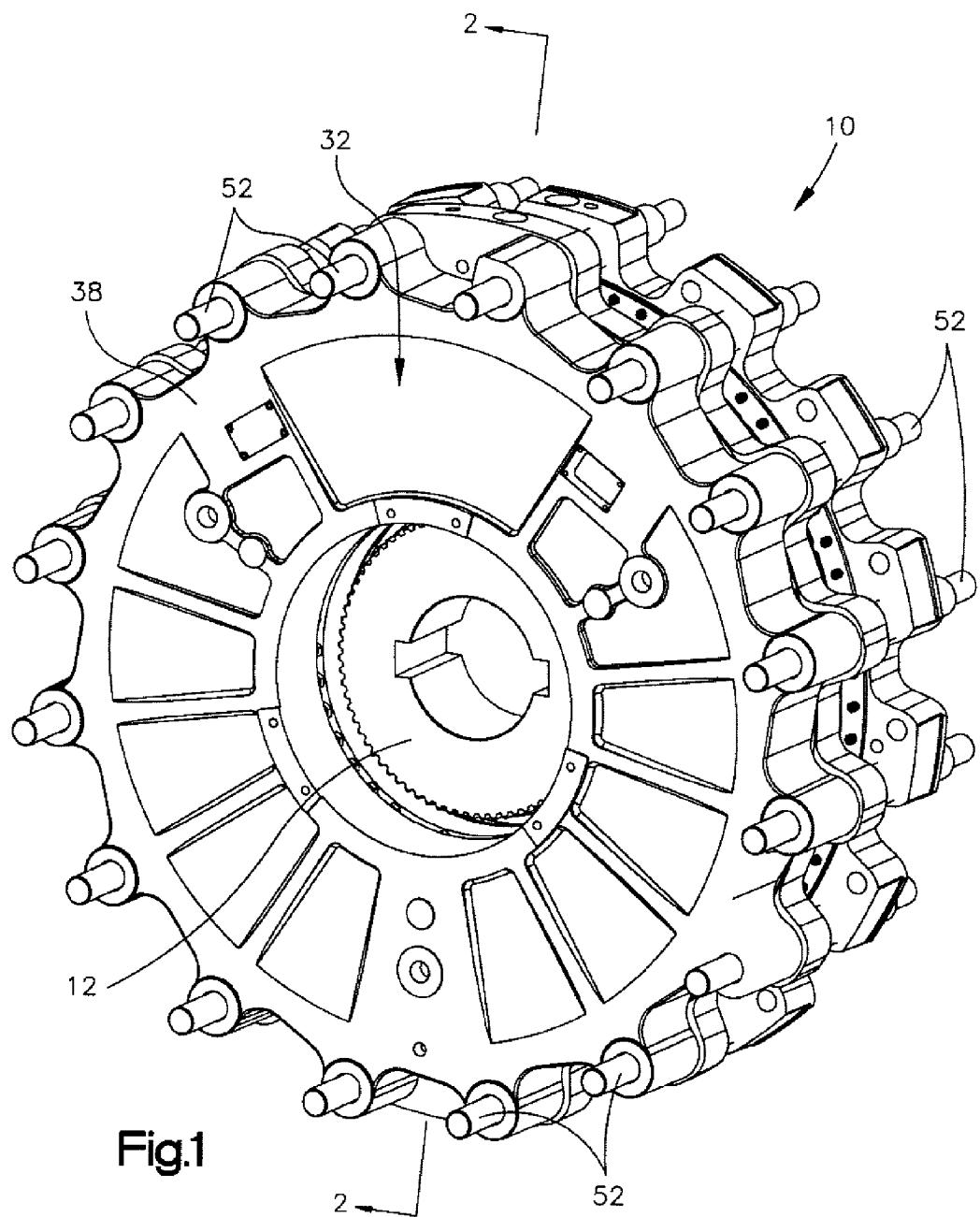
FIG. 1 is a front elevational view of a coupling assembly constructed in accordance with the present invention.

A coupling assembly 10 (FIGS. 1 and 2) is utilized to transmit force between a rotatable input member 12 and a stationary member 14 (FIG. 2). In the illustrated embodiment, the coupling assembly 10 is utilized as a brake and force is transmitted between the stationary member 14 and input member 12 by the coupling assembly 10 to hold the input member against rotation. If the coupling assembly 10 is to be utilized as a clutch, the member 14 would be rotatable under the influence of force transmitted from the input member 12 through the coupling assembly 10 to the member 14. It should be understood that the coupling assembly 10 may be a combination brake and clutch assembly.

The coupling assembly 10 (FIG. 2) includes a rotatable annular disc 18 to which the input member 12 is connected. In the illustrated embodiment, the input member 12 is a gear which is connected to a rotatable input shaft (not shown). A circular array of teeth on the periphery of the gear 12 are received in meshing engagement with corresponding teeth formed in a radially inner portion 20 of the disc 18. Annular friction pads or members 24 and 26 are mounted on axially opposite sides of the disc 18 in a coaxial relationship with the disc and the input member 12.

The disc 18 is at least partially enclosed by a housing assembly 32. The housing assembly 32 is fixedly connected to the member 14. As was previously mentioned, when the coupling assembly 10 is utilized as a brake, the member 14 is stationary. However, if the coupling assembly 10 is utilized as a clutch, the housing assembly 32 and member 14 may be rotatable.

The housing assembly 32 includes a cover or cylinder 38, a movable pressure plate 40 (FIGS. 2-4), and a mounting flange or stationary pressure plate 42 (FIG. 2). An annular piston 46 (FIG. 2) is mounted in an annular chamber 48 formed in the cover or cylinder 38. The cover or cylinder 38 and mounting flange 42 are fixedly interconnected so that they can not move axially or rotate relative to each other. However, the pressure plate 40 is movable along axially extending support posts 52 under the influence of force transmitted from the piston 46 to the pressure plate 40.

When the chamber 48 is pressurized with a suitable fluid, such as air, the piston 46 firmly presses the pressure plate 40 against the friction pad 24 disposed on the left (as viewed in FIG. 2) side of the disc 18. This force causes the disc 18 to move axially along the teeth on the input member 12 to press the right (as viewed in FIG. 2) friction pad 26 against the mounting flange or pressure plate 42. Since the mounting flange or pressure plate 42 is fixedly connected to the stationary member 14, this results in the disc 18 being firmly gripped between the pressure plate 40 and mounting flange or pressure plate 42 to retard rotation of the disc relative to the housing assembly 32.

The annular movable pressure plate 40 includes a base 56 (FIGS. 3 and 4) and a plate portion 60. The annular plate portion 60 is fixedly connected to and is coaxial with the annular base 56. The plate portion 60 cooperates with the base 56 to form an annular cooling fluid channel 64.

The annular cooling fluid channel 64 has an inlet 68 (FIGS. 2, 3 and 4) formed in the base 56 of the pressure plate 40. Fluid flow through the inlet 68 is conducted along an inlet passage 70 (FIG. 4) in the base 56. The inlet passage 70 is connected in fluid communication with the cooling fluid channel 64 (FIGS. 2 and 3). In the illustrated embodiment of the invention, the cooling fluid conducted through the cooling fluid channel 64 is water. However, a different cooling fluid may be used if desired.

Fluid is conducted from the annular cooling fluid channel 64 to an outlet 74 (FIG. 4) connected in fluid communication with the cooling fluid channel 64 through an outlet passage 76 (FIGS. 2 and 4). Fluid flows from the cooling fluid channel 64 through the outlet passage 76 and outlet 74. The outlet passage 76 is located diametrically opposite from the inlet passage 70.

When the coupling assembly 10 is in the disengaged condition (FIG. 2), the input member 12 and disc 18 are rotated by a drive shaft (not shown) which is connected to the input member. At this time, the friction pad 24 is spaced from the wear plate portion 60 of the pressure plate 40. Similarly, the friction pad 26 is spaced from the stationary mounting flange or pressure plate 42.

When the coupling assembly 10 is operated from the disengaged condition toward the engaged condition, the piston 64 (FIG. 2) moves the pressure plate 40 axially toward the rotating disc 18. This results in sliding engagement of the wear plate portion 60 of the pressure plate 40 with the friction pad 24 on the rotating disc 18. Engagement of the wear plate portion 60 of the pressure plate 40 with the friction pad 24 results in the generation of heat as the friction pad slides along the surface of the wear plate portion. This heat is transferred through the wear plate portion 60 to cooling fluid in the cooling fluid channel 64.

Although the wear plate portion 60 may be formed of many different materials, in the illustrated embodiment, the wear plate portion 60 is formed of copper or a copper alloy. The copper material of the wear plate portion 60 is effective to conduct heat to the cooling fluid in the annular cooling fluid channel 64. The heat which is transferred to the cooling fluid in the cooling fluid channel 64 is conducted from the coupling assembly 10 in the flow of cooling fluid from the outlet 74. This prevents excessive heating of the wear plate portion 60 and other components of the coupling assembly 10.

Figure 5:
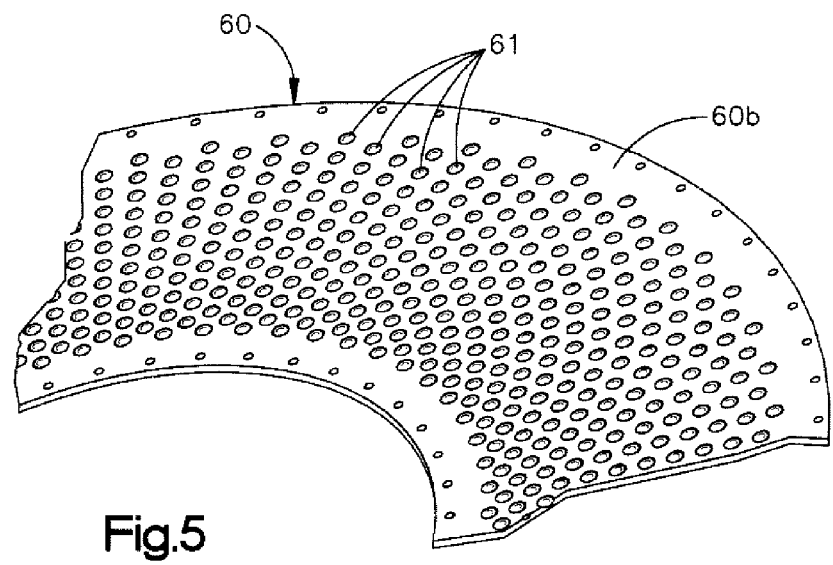
FIG. 5 is a plan view, illustrating the construction of an underside surface of wear plate portion in one embodiment of the present disclosure.

Wear plate portion 60 includes a substantially flat annular outer wear surface side 60a as seen in FIGS. 3 and 4, and an annular underside inner surface 60b as shown in FIG. 5. The underside or inner surface 60b includes a plurality of indentations 61 disposed therein. Indentations 61 may be situated so as to substantially cover the entire underside surface 60b to create turbulent and secondary flow for improving heat transfer in one embodiment, or situated in an arrangement or an array at varying locations.

Figure 7:
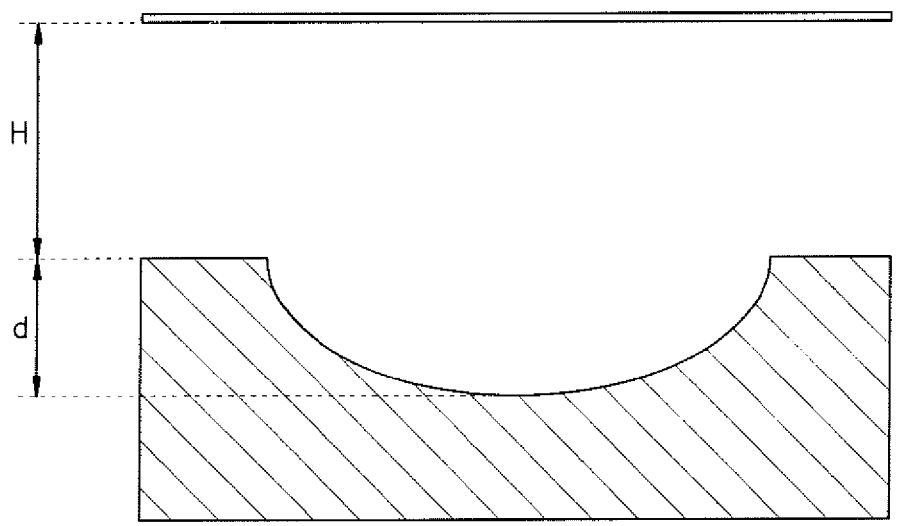
FIG. 7 is an enlarged fragmentary sectional view illustrating a construction of one type of indentation in one embodiment.
Figure 8:
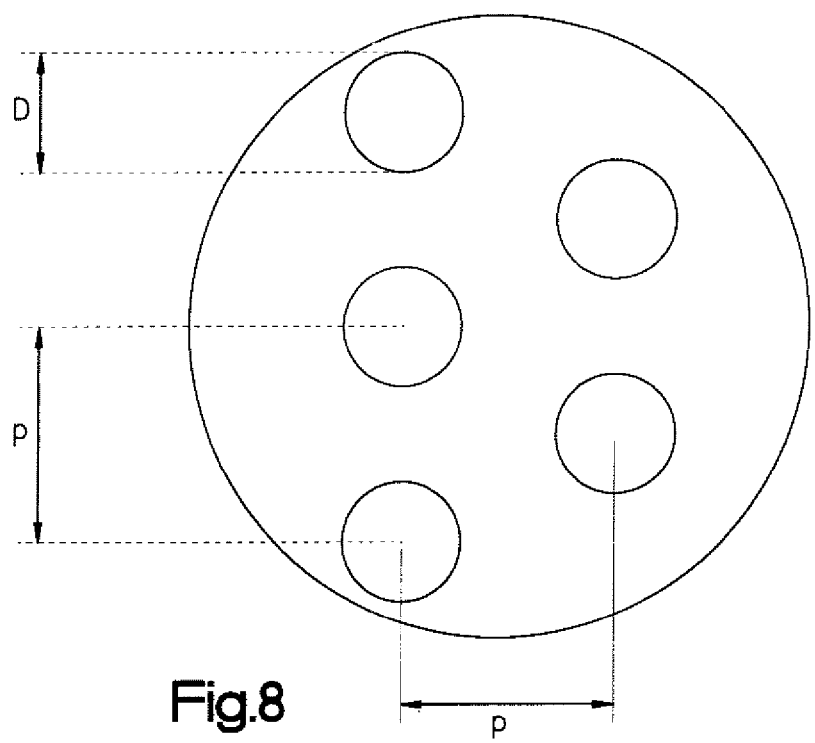
FIG. 8 is an enlarged fragmentary plan view of the inner side surface of the wear plate.

Indentations 61 may be dimples formed, pressed, stamped, cut or machined into the underside surface and may have any shape or form. In one embodiment, the indentations 61 are dimples with a half-circular shape or concave form forming a hemispherical shaped indentation. The dimples in the one embodiment have a ratio of depth (d) to diameter (D) ranging from approximately 0.06 to approximately 0.25 for dimples that have a hemispherical shape as best seen in FIGS. 7 and 8. The ratio of the pitch (p) between the dimples 61 to the height (H) of cooling channel 64 ranges approximately from approximately 2.5 to approximately 4.5. The height (H) of the cooling fluid channel 64 to dimple 61 diameter (D) ranges from approximately 0.2 to approximately 1. Other embodiments may include other shapes including but not limited to square, rectangular, triangular or polyon.

The cooling fluid channel 64 is constructed with the use of the indentations 61 to promote the transfer of heat from the wear plate portion 60 to a flow of cooling fluid in the cooling fluid channel. The transfer of heat to fluid in the cooling fluid channel 64 is promoted by the indentations 61 creating turbulent flow and secondary flow for improving heat transfer efficiency. In another embodiment, improved heat transfer is promoted by providing for a greater flow of cooling fluid in a radially outer portion of the cooling fluid channel 64 than in a radially inner portion of the cooling fluid channel.

Still another embodiment promotes improved heat transfer by reducing the depth of the cooling fluid channel 64, heat transfer is improved by having selected areas of increased flow of turbulence created with indentations 61. The increased flow turbulence promotes mixing of cooling fluid moving along an inner side of the plate portion 60 with cooling fluid moving along an inner side of the base 56 of a pressure plate 40. Although the cross sectional area of the cooling fluid channel 64 is reduced, the volumetric rate of flow of cooling fluid through cooling fluid channel is not reduced. Of course, this results in an increase in the velocity at which the fluid flows through the cooling fluid channel 64.

The cooling fluid channel 64 has an annular configuration which corresponds to the annular configuration of the plate portion 60 of the pressure plate 40. The cooling fluid flows in opposite directions, that is, clockwise and counterclockwise, from the inlet 68 (FIGS. 2, 3, and 4) to the outlet 74 (FIGS. 2 and 4). The cooling fluid flow is divided into a fluid flow in one direction and a fluid flow in the opposite direction immediately after the cooling fluid flows from the inlet passage 70 (FIG. 4) into the cooling fluid channel 64.

The cooling fluid channel 64 is divided into an annular radially outer cooling fluid channel section 82 (FIG. 6) and an annular radially inner cooling fluid channel section 84 by an axially projecting annular wall portion or rib 86. An additional rib 86 may be included for further support. Alternatively, rib 86 may be made wider to provide additional support. The radially outer and radially inner channel sections 82 and 84 have substantially the same radial extent. Thus, the distance from the radially outer side 90 (FIG. 6) of the annular wall portion or rib 86 to a circular radially inwardly facing side 92 of the radially outer channel section 82 is the same as the distance from a circular radially inner side 94 of the wall section or rib 86 to a circular radially outwardly facing side 96 of the cooling fluid channel 64.

The annular wall section or rib 86 cooperates with the wear plate portion 60 (FIG. 3) of the pressure plate 40 and the base 56 of the pressure plate to define the radially outer and radially inner cooling fluid channel sections 82 and 84 (FIG. 5). The inner side 60b of the wear plate portion 60 engages the axially projecting wall section or rib 86 to block fluid flow across the wall section or rib 86 in one embodiment.

The radially outer channel section 82 (FIG. 6) has an annular bottom surface 100. The bottom surface 100 extends from the outer side 90 of the annular wall portion or rib 86 to the inwardly facing side 92 of the base 56. Similarly, the radially inner channel section 84 has an annular bottom surface 102 formed on the base 56. The annular bottom surface 102 extends from the radially inner side 94 of the annular wall section or rib 86 to the radially outwardly facing side 96 of the base 56.

The bottom surface 100 on the radially outer channel section 82 is spaced the same distance from the inwardly facing inner side surface 60b of the wear plate 60 as is the bottom surface 102 on the radially inner channel section 84. The bottom surface 100 on the radially outer channel section 82 is disposed in a coplanar relationship with the bottom surface 102 on the radially inner channel section 84. Therefore, the radially outer and inner channel sections 82 and 84 have the same uniform depth throughout their extent. However, one channel section 82 or 84 could be deeper than the other channel section if desired.

The indentations 61 may be divided into a plurality of groups along the length in the inner side 60b of the wear plate 60 above the radially outer and radially inner channel sections 82 and 84. Groups of indentations 61 located above the radially outer channel section 82 may be radially offset from other groups of indentations 61 above each subsection 116 of the radially outer channel section 82. Similar, the groups of indentations 61 above the radially inner channel section 84 may be radially offset from other groups of indentations 61 above subsection 122 of the radially inner channel section 84.

In other embodiments, there may be the same number of indentations 61 above each subsection 116 or different numbers of indentations 61 may be provided above subsection 116 or another subsection 118 in the radially outer channel section 82. For example, a larger number of indentations 61 could be provided above subsection 116 than above subsection 118. Similarly, a larger number of indentations 61 could be provided above subsection 122 than above another subsection 124 in the radially inner channel section 84.

By having the indentations 61 in the subsections 116, 118, 122 and 124 (FIG. 6) radially offset from each other, the fluid flow through the radially outer and radially inner channel sections 82 and 84 is diverted somewhat to thereby promote turbulence in the flow of fluid and the transfer of heat from the plate portion 60 (FIGS. 3 and 4) to the cooling fluid flowing in the radially outer and inner channel sections 82 and 84. Of course, the indentations 61 in the subsection 116 may be radially aligned with the indentations 61 in the subsection 118 if desired. Similarly, the indentations 61 in the subsection 122 may be radially aligned with the indentations 61 in the subsection 124 if desired.

When the coupling assembly 10 is in the disengaged condition, the inner side surface 60b of the wear plate portion 60 is spaced from the flat upper side surface of the wall section or rib 86. When the coupling assembly 10 is in the engaged condition, the flat portion of the inner side surface 60b with the indentations 61 of the wear plate portion 60 (FIG. 3) is disposed in abutting engagement with the flat upper side surface of the wall section or rib 86. Therefore, when the coupling assembly 10 is in the engaged condition, the wear plate portion 60 is supported by engagement of the flat portion of the inner side surface 60b of the wear plate portion 60 with the wall section or rib 86. This promotes uniform sliding engagement of the outer or upper (as viewed in FIGS. 3 and 4) side surface of the wear plate portion 60 with the friction pad 24 (FIG. 2) as the coupling assembly 10 is operated to the engaged condition.

During a flow of cooling fluid along the radially outer channel section 82 (FIG. 6), one feature of the indentations 61 is that they do not reduce the area available for cooling fluid flow and still provide improved heat transfer with less pressure drop by not protruding into the flow. Therefore, a staggered arrangement of the indentations 61 can potentially produce an elliptic flow field in which flow events in one indentation 61 can fluidly communicate with flow events in other indentations 61. The indentations 61 serve to increase both heat transfer and induce instabilities in the flow as the cooling fluid flow accelerates around the cooling channel.

Figure 6:
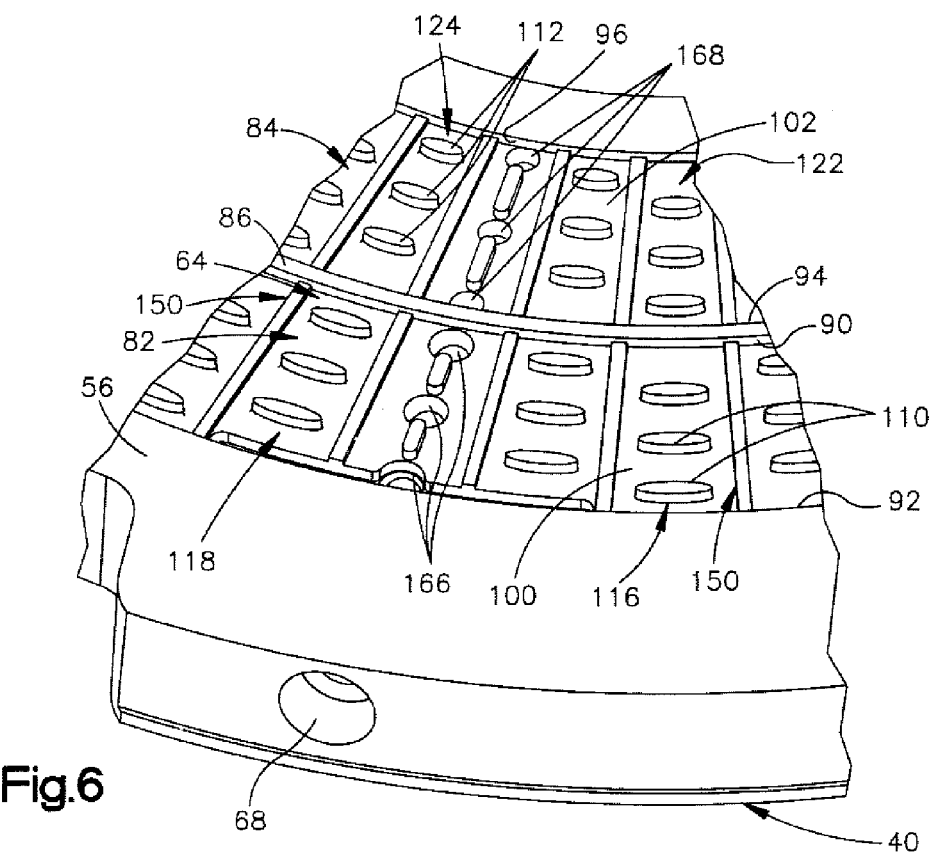
FIG. 6 is an enlarged fragmentary pictorial illustration of a portion of the wear plate.

In the embodiment of the invention illustrated in FIGS. 1-7, the indentations 61 are formed as hemispherical indentations in the surface on the inner side 60b of the wear plate portion 60 of the pressure plate 40. The inner side 60b of the wear plate portion 60 covers the cooling channel 64. If desired, the indentations 61 on the inner side surface 60b of the wear plate portion 60 may be used in combination with projections 112 on the base 56 of the pressure plate 40. Projections 112 may have an elliptical shape as seen in FIG. 6.

Indentations 61 may be formed in the bottom of cooling channel surface 100, 102 in the base 56, or in other embodiments in both the base and wear plate portion 60. The indentations 61 may be formed separately in a copper material and then later attached to the base and/or wear plate portion.

In the embodiment of the invention illustrated in FIGS. 1-7, the indentations 61 all have the same general configuration. It is contemplated that indentations 61 may have configurations which are different from each other and different from the illustrated configurations. For example, the indentations 61 in FIG. 7 may have a polygonal shape in a plane parallel to the surface of inner side 60b. It is contemplated that some of the indentations 61 can have one configuration and other of the indentations 61 have a different configuration The base 56 of the pressure plate 40 may include a plurality of ribs 150 (FIG. 6) that project into the cooling fluid channel 64. Thus, the ribs 150 are projections which extend between the radially inwardly facing outer side 92 (FIG. 6) of the cooling fluid channel 64 and the radially outwardly facing inner side 90 on the wall section on rib 86. In addition, the ribs 150 extend between the radially inwardly facing side 94 of the wall section or rib 86 and the radially outwardly facing side 96 of the cooling fluid channel 64. Although the ribs 150 extend along radii of the annular cooling fluid channel 64, the ribs 150 may be skewed relative to the radii of the cooling fluid channel 64 if desired.

The height of the ribs 150 is less than the height of the wall section or rib 86 which divides the cooling fluid channel 64 into a radially outer channel section 82 and a radially inner channel section 84. The wall section or rib 86 is engaged by the wear plate portion 60 and cooperates with the wear plate portion to block fluid flow between the radially outer and radially inner channel sections 82 and 84. The ribs 150 are spaced from the wear plate portion 60, that is, the upper sides of the ribs 150 are spaced from the lower or inner side of the wear plate 60.

Although the ribs 150 in the radially outer channel section 82 are radially aligned with the ribs 150 in the radially inner channel section 84, the ribs in one channel section may be offset from the ribs in the other channel section. If desired, the ribs 150 may be offset by a distance sufficient to enable a plurality of indentations 61 in the inner side surface 60*b* of wear plate 60 to be located between adjacent ribs at substantially the same radial distance from a center of curvature of the cooling fluid channel 64.

During flow of cooling fluid along the radially outer and inner channel sections 82 and 84, the cooling fluid flows in the restricted space between the inner side of the wear plate portion 60 and the upper sides of the ribs 150. The ribs 150 also increase the velocity of the cooling fluid and induce turbulence in the cooling fluid. The turbulence which is induced in the flow of cooling fluid by the ribs 150 causes the cooling fluid to impinge against the flat part of the surface of the inner side 60*b* of the wear plate portion 60 and in the cavities of the indentations 61. This turbulence promotes mixing of fluid in the area of the ribs and effect further heat transfer.

In addition, the ribs 150 decrease the cross sectional area of the cooling fluid channel 64 at the ribs 150. Thus, the cooling fluid flow area at the ribs 150 is reduced to the area between the upper (as viewed in FIG. 6) side surfaces of the ribs and the inner side surface of the wear plate portion 60. By decreasing the area available for cooling fluid flow, the velocity of the cooling fluid is increased as it flows across the ribs 150. Increasing the velocity of the cooling fluid further promotes turbulence in the fluid flow adjacent to the ribs 150.

The use of the ribs 150 in combination with the indentations 61 has been described for one embodiment of the subject disclosure. It should be understood that the ribs 150 are an optional feature for use with the indentations 61. The indentations 61 may be used with or without the ribs 150. Although it is preferred to utilize the wall section or rib 86 to divide cooling fluid channel 64 into radially inner and radially outer channel sections 82 and 84, the wall section or rib 86 may also be omitted and employ only the indentations 61 in the inner side surface 60*b* of the wear plate portion 60.

When the coupling assembly 10 is operated from the disengaged condition of FIG. 1 to the engaged condition, the wear plate portion 60 of the pressure plate 40 is pressed against the rotating friction pad 24 on the disc 18. The radially outer portion of the disc 18 is rotating at a higher velocity than the radially inner portion of the disc. Therefore, as the coupling assembly 10 is operated from the disengaged condition to the engaged condition, more heat is generated adjacent to the radially outer portion of the wear plate portion 60 than is generated adjacent to the radially inner portion of the wear plate portion.

To promote cooling of the radially outer portion of the wear plate portion 60, where the greatest amount of heat is generated during operation of the coupling to the engaged condition, the inlet 68 (FIG. 4) is effective to direct a greater flow of cooling fluid to the radially outer channel section 82 (FIGS. 5-6) than to the radially inner channel section 84. To provide for the larger fluid flow through the radially outer channel section 82, a cylindrical radially outer initial portion 160 (FIG. 4) of the inlet passage 70 has a larger diameter than a cylindrical radially inner second portion 162 of the inlet passage 70.

The relatively large diameter initial portion 160 of the inlet passage 70 is connected in fluid communication with the radially outer channel section 82 by a plurality of connector passages 166 (FIG. 4). Similarly, the relatively small diameter second portion 162 of the inlet passage is connected in fluid communication with the radially inner channel section 82 by a plurality of connector passages 168. A flow of cooling fluid enters the inlet passage 70 (FIG. 4) at the inlet 68. A relatively large volume of the cooling fluid is conducted from the initial portion 160 of the inlet fluid passage 70 to the radially outer channel section 82. A smaller volume of cooling fluid is conducted from the relatively small second portion 162 of the inlet fluid passage 70 to the radially inner channel section 84.

The cylindrical initial portion 160 of the inlet passage 70 is disposed in an approximate axial alignment with the cylindrical second portion 162 of the inlet passage. However, the central axis of the second portion 162 of the inlet passage 70 may be offset from the central axis of the initial portion 160 of the inlet passage. If desired, the initial portion 160 of the inlet passage 70 may be disposed to one side of the second portion 162 of the inlet passage so as to have one fluid flow path to the radially outer channel section 82 and a second, separate, fluid flow path to the radially inner channel section 84.

The radially outer channel section 82 extends in opposite directions from connector passages 166 (FIGS. 4 and 6) to the outlet passage 76. Thus, the radially outer channel section 82 extends in both a clockwise and a counterclockwise direction from the inlet passage 70 to the outlet passage 74. Similarly, the radially inner channel section 82 extends in opposite directions from the inlet passage 70 to the outlet passage 76. Thus, the radially inner channel section 84 extends in both a clockwise and counterclockwise direction (as viewed in FIG. 3) from the inlet 68 to the outlet 74 (FIG. 4). The fluid flow is equally divided, in the radially outer channel section 82, between the clockwise and counterclockwise flowing sections of the radially outer channel section. Similarly, the fluid flow is equally divided, in the radially inner channel section 84, between the clockwise and counterclockwise flowing sections of the radially inner channel section.

The outlet passage 76 (FIG. 4) has the same construction as the inlet passage 70. Thus, the cylindrical outlet passage 76 has a radially outer or exit portion 174 with a larger diameter than a radially inner or entrance portion 176. The fluid flowing in the radially inner channel section 84 is conducted to the entrance portion 176 through connector passages 180. Similarly, fluid is conducted from the radially outer channel section 82 to the exit portion 174 of the outlet passage 76 through connector passages 182.

The cylindrical exit portion 174 of the outlet passage 76 is disposed substantially in axial alignment with the cylindrical entrance portion 176 of the outlet passage. However, the central axis of the entrance portion 176 of the outlet passage 76 may be offset from the central axis of the exit portion 174 of the outlet passage. If desired, the entrance portion 176 of the outlet passage 76 may be disposed to one side of the exit portion 174 of the outlet passage so as to have one fluid flow path from the radially inner channel section 84 and a second, separate, fluid flow path from the radially outer channel section 82.

The inlet and outlet passages 70 and 76, which provide a greater rate of fluid flow to the radially outer channel section 82 than the radially inner channel section 84, may be utilized in association with cooling fluid channels having a construction which is different from the construction of the cooling fluid channel 64.

When the coupling assembly 10 is in the disengaged condition of FIG. 2, the friction pads 24 and 26 on the disc 18 are slightly spaced from the axially movable pressure plate 40 and the stationary mounting flange or pressure plate 42. This enables the disc 18 to freely rotate relative to the stationary member 14 and housing assembly 32.

When the coupling assembly 10 is to be operated from the disengaged condition to the engaged condition, the piston 46 moves the pressure plate 40 axially toward the mounting flange or pressure plate 42 to firmly grip the disc 18 between the pressure plate 40 and mounting flange or pressure plate 42.

The mounting flange or pressure plate 42 may have a construction which is similar to the construction of the pressure plate 40. In that case, the components of the mounting flange or pressure plate 42 are the same as the components of the pressure plate 40.

In view of the foregoing description, it is apparent that the present disclosure provides a new and improved coupling assembly 10 having an improved flow of cooling fluid to promote the transfer of heat from components of the coupling assembly. Convective heat transfer from components of the coupling assembly 10 to the flow of cooling fluid is promoted by providing indentations 61 in the inner surface 60b of the wear plate portion 60 and optionally by increasing the velocity of the cooling fluid at spaced apart areas along a channel 64 through which the cooling fluid flows. Upon engagement of the coupling assembly 10, more heat tends to be generated at a radially outer portion of a rotating disc 18 than at a radially inner portion of the disc. To remove this heat, the flow of cooling fluid adjacent to the radially outer portion of the rotating disc 18 may be larger than adjacent to the radially inner portion of the rotating disc.

The coupling assembly 10 may include the rotatable disc 18 which is at least partially enclosed by a housing 32. The housing 32 may have a plate portion 60 with a force transmitting surface which is engagable with a side surface area on the rotatable disc 18 to retard relative rotation between the housing and the disc. The housing 32 may also have a cooling fluid channel 64 which is at least partially defined by an inner 60b side of the plate portion 60 opposite from the force transmitting surface.

To improve heat transfer and minimize the occurrence of hot spots, a plurality of indentations 61 are provided in the inner side surface 60b to promote turbulence with less pressure drop in the path of flow of cooling fluid through the cooling fluid channel 64.

A fluid inlet 68 to the cooling fluid channel 64 may have a relatively large cross sectional area portion 160 connected in fluid communication with a radially outer portion 82 of the cooling fluid channel. The inlet 68 may have a relatively small cross sectional area portion 162 connected in fluid communication with a radially inner portion 84 of the cooling fluid channel 64.

A coupling assembly 10 constructed in accordance with the present disclosure has many different features which may advantageously be utilized together as disclosed herein. However, these features may be utilized separately or in combination with the other various features described herein. For example, the cooling fluid inlet 68 with different sizes for radially inner and radially outer portions 82 and 84 of the cooling fluid channel 64 may be utilized with projections into the cooling fluid channel. As another example, the cooling fluid channel 64 may or may not include the ribs 150.

Although the coupling assembly 10 disclosed herein is utilized as a brake, it should be understood that the coupling assembly may be utilized as a clutch. It is also contemplated that the coupling assembly may be a combination clutch and brake assembly.

While specific embodiments of the disclosure have been shown and described in detail to illustrate the applications of the present disclosure, it will be understood that the disclosure may be embodied otherwise without departing from such principles.

I claim:

1. A water cooled coupling assembly for use in transmitting force, said coupling assembly comprising an annular rotatable disc, and a housing which at least partially encloses said rotatable disc, said housing having a plate portion with a force transmitting surface which is engageable by a circular side surface area on said rotatable disc to retard relative rotation between said housing and said disc, a cooling fluid channel which is at least partially defined by a side of said plate portion opposite from said force transmitting surface, an inlet through which water is conducted into said cooling fluid channel, an outlet through which water is conducted from said cooling fluid channel, an inner surface of said plate portion opposite said force transmitting surface including a plurality of hemispherical indentations disposed therein with said indentations substantially covering said inner surface and situated in a direction for creating turbulence and secondary flow into a path of flow of water through said cooling fluid channel to improve heat transfer between said plate portion of said housing and water flowing through said cooling fluid channel, said cooling fluid channel has a circular configuration, said inlet through which water is conducted into said cooling fluid channel includes an inlet passage having a first portion which is connected in fluid communication with a radially outer portion of said cooling fluid channel and a second portion which is connected in fluid communication with a radially inner portion of said cooling fluid channel, said first portion of said inlet passage having a first cross sectional area in a first plane extending perpendicular to a longitudinal central axis of said first portion of said inlet passage, said second portion of said inlet passage having a second cross sectional area in a second plane extending perpendicular to a longitudinal central axis of said second portion of said inlet passage, said first cross sectional area being greater than said second cross sectional area, said inlet passage being effective to conduct flow from said first portion of said inlet passage to said second portion of said inlet passage.

2. A coupling assembly as set forth in claim 1, further comprising a plurality of projections which includes a plurality of ribs disposed at spaced apart locations along said cooling fluid channel, each of said ribs extends between a radially inner portion of said cooling fluid channel and a radially outer portion of said cooling fluid channel.

3. A coupling assembly as set forth in claim 2 wherein said plurality of projections includes the plurality of ribs which extend between radially inner and outer edge portions of said cooling fluid channel.

4. A coupling assembly as set forth in claim 1 wherein said cooling fluid channel has a circular configuration, some of said plurality of indentations being disposed in a radially outer portion of said cooling fluid channel and some of said plurality of indentations being disposed in a radially inner portion of said cooling fluid channel.

5. A coupling assembly as set forth in claim 1 wherein said indentations have an elliptical shape.

6. A coupling assembly as set forth in claim 1 wherein said cooling fluid channel has a circular configuration and has a first section extending in a first direction from said inlet to said outlet and a second section extending in a second direction from said inlet to said outlet.

7. A coupling assembly as set forth in claim 1 wherein said cooling fluid channel has a circular configuration and further comprising a plurality of projections including a plurality of spaced apart projections which are disposed between radially inner and radially outer edge portions of said cooling fluid channel and which are spaced apart from the radially inner and outer edge portions of said cooling fluid channel.

8. A coupling assembly as set forth in claim 1 wherein each of said indentations include a depth (d) and a diameter (D) with a ratio of said depth (d) to diameter (D) ranging from 0.06 to 0.25.

9. A coupling assembly as set forth in claim 1 wherein said cooling fluid channel includes a height (H) and each of said indentations include a diameter (D) with a ratio of the cooling fluid channel height (H) to indentation diameter (D) ranging from 0.2 to 1.

10. A coupling assembly as set forth in claim 1 wherein each of said indentations include a distance identified as a pitch between an approximate center for each indentation and said cooling fluid channel includes a height (H), a ratio of said pitch (p) to said height (H) ranging from 2.5 to 4.5.

* * * * *